US008542888B2

(12) United States Patent
Perlmutter et al.

(10) Patent No.: US 8,542,888 B2
(45) Date of Patent: Sep. 24, 2013

(54) DETECTING FACIAL SIMILARITY BASED ON HUMAN PERCEPTION OF FACIAL SIMILARITY

(75) Inventors: Sharon M. Perlmutter, Pacific Palisades, CA (US); Keren O. Perlmutter, Pacific Palisades, CA (US); Joshua Alspector, South Riding, VA (US); Alex Holub, Pasadena, CA (US); Mark Everingham, Oxford (GB); Pietro Perona, Altadena, CA (US); Andrew Zisserman, Jericho (GB)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 13/549,959

(22) Filed: Jul. 16, 2012

(65) Prior Publication Data
US 2012/0281910 A1 Nov. 8, 2012

Related U.S. Application Data

(63) Continuation of application No. 13/024,383, filed on Feb. 10, 2011, now Pat. No. 8,233,679, which is a continuation of application No. 11/382,657, filed on May 10, 2006, now Pat. No. 7,907,755.

(51) Int. Cl.
*G06K 9/00* (2006.01)
(52) U.S. Cl.
USPC ........... 382/118; 382/180; 382/224; 382/100; 382/305; 707/217.019
(58) Field of Classification Search
USPC .......... 382/180, 224, 100, 305; 707/E17.019
See application file for complete search history.

(56) References Cited

U.S. PATENT DOCUMENTS

| 5,642,431 | A | 6/1997 | Poggio et al. |
| 5,850,470 | A | 12/1998 | Kung et al. |
| 5,893,095 | A | 4/1999 | Jain et al. |
| 6,222,939 | B1 | 4/2001 | Wiskott et al. |
| 6,563,950 | B1 | 5/2003 | Wiskott et al. |
| 6,574,632 | B2 | 6/2003 | Fox et al. |
| 6,832,006 | B2 | 12/2004 | Savakis et al. |
| 7,106,903 | B2 | 9/2006 | Chang et al. |
| 7,783,085 | B2 | 8/2010 | Perlmutter et al. |

(Continued)

OTHER PUBLICATIONS

"Fujifilm Displays Face Recognition and Detection Ability; Available in New Electronic Photo Album," DigitalCameraInfo.com, pp. 1-6, Oct. 20, 2005, available at http://www.digitalcamerainfo.com/content/Fujifilm-Displays-Face-Recognition-and-Detection-Ability-Available-in-new-Electronic-Photo-Book.htm.

(Continued)

*Primary Examiner* — Ruiping Li
(74) *Attorney, Agent, or Firm* — Finnegan, Henderson, Farabow, Garrett & Dunner, LLP

(57) ABSTRACT

Similar faces may be determined within images based on human perception of facial similarity. The user may provide an image including a query face to which the user wishes to find faces that are similar. Similar faces may be determined based on similarity information. Similarity information may be generated from information related to a human perception of facial similarity. Images that include faces determined to be similar, based on the similarity information, may be provided to the user as search result images. The user then may provide feedback to indicate the user's perception of similarity between the query face and the search result images.

21 Claims, 12 Drawing Sheets

(56) References Cited

U.S. PATENT DOCUMENTS

| | | |
|---|---|---|
| 2004/0264780 A1 | 12/2004 | Zhang et al. |
| 2005/0084154 A1 | 4/2005 | Li et al. |
| 2005/0226509 A1 | 10/2005 | Maurer et al. |
| 2006/0251292 A1 | 11/2006 | Gokturk et al. |
| 2009/0052768 A1* | 2/2009 | Zhao .............................. 382/159 |

OTHER PUBLICATIONS

"Riya Eases Pain of Pile of Pix," Wired News, 4 pages, Nov. 11, 2005, available at http://www.wired.com/news/print/0,1294,69514,00.html.

Bartell, B.T. et al., "Optimizing Similarity Using Multi-Query Relevance Feedback," Journal of the American Society for Information Science, 49(8) 742-671, Jun. 1998.

Cohen, I. et al., "Vision-Based Overhead View Pearson Recognition," Proceedings of the 15th International Conference on Pattern Recognition, Barcelona, Spain, pp. 1119-1124, 2000.

Everingham, M. et al., "Regression and Classification Approaches to Eye Localization in Face Images," Proceedings of the 7th International Conference on Automatic Face and Gesture Recognition (FGR06), Washington, D.C., pp. 441-448, Apr. 10, 2006, available at http://fg2006.ecs.sotion.ac.uk/.

Gargi, U., et al., "Managing and Searching Personal Photo Collections," Hewlett-Packard Laboratories, Palo Alto, California, 9 pages, Mar. 18, 2002, available at http://www.hpl.hp.com/techreports/2002hHPL-2002-67.html.

Houlb, A. et al., "Towards Finding Perceptually Similar Faces," Visions Science Society, 1 page, May 10, 2005.

Li et al., "IRM: Integrated region matching for image retrieval," 2000, ACM, 1-58113-198-4, pp. 147-156.

PCT International Search Report and Written Opinion issued Dec. 10, 2008 in International Application No. PCT/US07/68647, 12 pages.

Porkaew, K. et al., "Query refinement for multimedia similarity retrieval in MARS," ICMCS, pp. 747-751, 1999.

Scholkopf et al., "Comparing Support Vector Machines with Gaussian Kernels to Radial Basis Function Classifiers," Nov. 1997, IEEE Transactions on Signal Processing, vol. 45, No. 11, pp. 2758-2765.

Steyvers, M. et al., "Predicting Similarity Ratings to Faces Using Physical Descriptions," in "Computational, Geometric, and Process Perspectives on Facial Cognition: Context and Challenges," Wenger, M.J. and J.T. Townsend eds., Mahwah, New Jersey, pp. 116-145, 2001.

Turk, M. et al., "Eigenfaces for Recognition," Journal of Cognitive Neuroscience, vol. 3, No. 1, pp. 71-86, Winter 1991.

Yuen, P.C. et al., "Enhanced Human Face Image Searching System using Relevance Feedback," Proceedings of the Sixth IEEE International Conference on Automatic Face and Gesture recognition (FGR '04), 6 pages, 2004.

Zhang, L. et al., "Bayesian Face Annotation in Family Albums," Proceedings of the International Conference on Computer vision (ICCV), Nice, France, 2 pages, 2003, available at http://research.microsoft.com/users/leizhang/Paper/ICCV03Demo.pdf.

* cited by examiner

212

Provide a user with search result images and user interface configured to receive user feedback regarding the similarity of the faces in the search result images to the query face — 802

Receive user feedback (e.g., an indication of which search result images have faces that are similar to the query face and which do not) via the user interface — 804

Update the search results based on the received user feedback — 806

Fig. 8

DETECTING FACIAL SIMILARITY BASED ON HUMAN PERCEPTION OF FACIAL SIMILARITY

CROSS REFERENCE TO RELATED APPLICATIONS

This application is a continuation of U.S. patent application Ser. No. 13/024,383, filed Feb. 10, 2011, now U.S. Pat. No. 8,233,679, which is a continuation of U.S. patent application Ser. No. 11/382,657, filed May 10, 2006, now U.S. Pat. No. 7,907,755. The disclosures of the above applications are expressly incorporated herein by reference to their entireties.

TECHNICAL FIELD

This description relates to determining similar faces within images.

BACKGROUND

Facial feature detection systems may search a database of images including faces for faces that are the same as a query face. Facial feature detection systems of this type typically are used for law enforcement and security applications.

SUMMARY

In one aspect, similar faces within images are determined based on a user's perception of facial similarity. Similarity information that indicates human perception of facial similarity is determined. A query image that includes a query face is received. One or more search result images that include at least one face that is similar to the query face are determined based on the similarity information that indicates the human perception of facial similarity. The search result images are provided to a user.

Implementations may include one or more of the following features. For example, a mapping function may be determined between an objective feature space and a psychological feature space. One or more search result images that include at least one face that is similar to the query face may be determined based on the mapping function.

A query feature vector may be generated in the objective feature space based on the query face. The query feature vector may be mapped from the objective feature space into the psychological feature space using the mapping function. A set of search feature vectors in the psychological feature space that are associated with a set of search faces may be accessed. Distances between the mapped query feature vector and the search feature vectors may be determined. One or more search feature vectors that are within a selected distance of the mapped query vector may be selected. Images that include the search faces associated with the selected search feature vectors may be designated as the one or more search result images.

A set of search feature vectors in the objective feature space that are associated with a set of search faces may be accessed. The search feature vectors may be mapped from the objective feature space into the psychological feature space to form the set of search feature vectors in the psychological feature space that are associated with a set of search faces.

A class for the query face may be detected. A collection of feature vectors in the psychological feature space that are associated with a collection of faces may be accessed. Faces in the collection of faces that are the same class as the query face may be determined. The set of search feature vectors may be formed by selecting the feature vectors in the collection of feature vectors that correspond to the faces in the collection of faces that are the same class as the query face.

The distances may be weighted Euclidean distances, such that weighted Euclidean distances between the mapped query feature vector and the search feature vectors may be determined.

A query feature vector may be generated in the objective feature space based on the query face. A set of search feature vectors in the objective feature space that are associated with a set of search faces may be accessed. Distances between the query feature vector and the search feature vectors may be determined. The distances may be mapped into the psychological feature space. One or more search feature vectors that are within a selected distance of the query vector may be selected based on the mapped distances. Images that include the search faces associated with the selected search feature vectors may be designated as the one or more search result images.

A class for the query face may be detected. A collection of feature vectors in the objective feature space that are associated with a collection of faces may be accessed. Faces in the collection of faces that are the same class as the query face may be determined. The set of search feature vectors may be formed by selecting the feature vectors in the collection of feature vectors that correspond to the faces in the collection of faces that are the same class as the query face.

The distances may be weighted Euclidean distances, such that weighted Euclidean distances between the query feature vector and the search feature vectors may be determined.

Inequalities between training faces may be determined. Inequalities may represent a similarity of two training faces with respect to two other training faces. A mapping function between an objective feature space and a psychological feature space may be determined based on the inequalities.

Training feature vectors in the objective feature space may be determined based on the training faces. The training feature vectors may be separated by objective distances. A function over a matrix M that minimizes differences between the objective distances and the inequalities may be optimized.

The search result images may be provided to the user in a dating application or in a social networking application.

Implementations of any of the techniques described may include a method or process, an apparatus or system, or computer software on a computer-useable medium. The details of particular implementations are set forth below. Other features will be apparent from the description and drawings, and from the claims.

DESCRIPTION OF DRAWINGS

FIGS. 2-8 are flow charts illustrating examples of processes for determining similar faces within images based on human perception of facial similarity.

DETAILED DESCRIPTION

The following discussion describes techniques to find faces, among a set of faces, that are perceptually similar to a query face. In other words, techniques are described to find faces that are similar in a subjective or psychological sense, but which may or may not be exact matches for a face in a query image.

Such techniques may be useful in a number of applications. For example, a user of an online dating service may wish to find people who look like a particular person, such as a celebrity, for example, or, more generally, to find people who look similar to someone the user finds attractive. As a particular example of the techniques applied to an online dating site, a user may find Nicole Kidman attractive, and wish to locate users of the online dating site that look similar to Nicole Kidman. In this case, the user can submit a picture of Nicole Kidman to the system and indicate that the system should "find me people who look like this," i.e., return faces that are perceptually similar to that of Nicole Kidman in a subjective or psychological sense. The system then searches the faces of users of the online dating site and determines users who have faces that are perceptually similar to Nicole Kidman.

As another example of the techniques applied to an online dating service, a person may search through a database of images on the online dating service and find an image of someone whom the user finds attractive. The user may then instruct the system to further refine their search to "find me people who look like this." The system then may search and locate users with faces that look similar to the face chosen by the user.

The techniques may be applied in other applications, such as, for example, applications available to people who belong to an internet service (such as America Online® (AOL®)) or a social networking service (such as myspace.com) that allow the posting of digital photos. For example, using such a service, a user may be interested in finding other users of the service who look like the user. In another example, a user may wish to find other users of the service who look like a particular person, such as a celebrity. Furthermore if the service has a database of celebrity images, the user may wish to determine which celebrity the user most resembles.

Objective criteria about faces may be used to assess similarity between faces. However, it may not be enough that two faces are objectively similar, such as, for example, having the same hair color or the same eye shape. When determining that a face is similar to a query face, more accurate results may be obtained by taking into account human subjective perception of similarity. The following discussion also describes techniques that may produce more accurate results by using a particular user's perception of facial similarity to determine perceptually similar faces.

Figure 1:
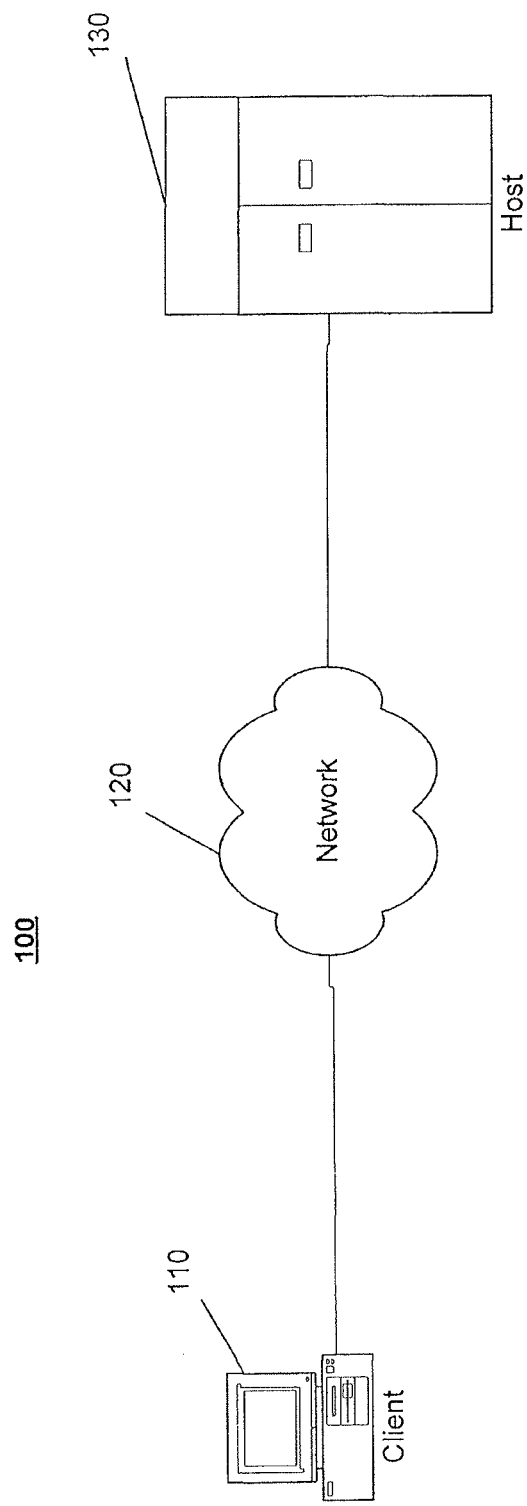
FIG. 1 is a block diagram showing an example of a communications system configured to provide images having faces similar to a query face based on human perception of facial similarity.

FIG. 1 is a block diagram showing an example of a communications system 100 that includes a client 110 connected to a host 130 through a network 120. In general, the host 130 is configured to receive a query face from the client 110, search images to locate perceptually similar faces based on human perception of facial similarity, and, at least in some implementations, send the images having similar faces to the client 110 for display.

Each of the client 110 and the host 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 and host 130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110 or the host 130.

The network 120 includes hardware and/or software capable of enabling direct or indirect communications between the client 110 and the host 130. As such, the network 120 may include a direct link between the client 110 and the host 130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

In one implementation, the client 110 includes one or more client applications (e.g., a web browser, a mail application, an instant messaging client, an Internet service provider client, a media player, or another client application) capable of receiving one or more data units. The client applications may run on a general-purpose operating system and a hardware platform that includes a general-purpose processor and specialized hardware for graphics, communications and/or other capabilities. In another implementation, the client 110 may include a wireless telephone, or personal digital assistant (PDA), running a micro-browser application on an embedded operating system with general purpose and specialized hardware capable of operating in mobile environments.

In general, the client 110 presents one or more user interfaces (UIs) that enable a user to search for faces that are perceptually similar to a query face. The UIs may be rendered on client 110, for example, as part of a so-called thick client application, or may be rendered by a so-called thin client application, such as a web browser. For instance, the UIs may be one or more web pages rendered by a web browser. In some implementations, the Ms may relate to an online dating service.

More particularly, client 110 may be configured to receive information related to human perception of facial similarity and transmit this information to host 130. Client 110 also may present one or more UIs that allow a user to select a query face and provide the query face to host 130. The user may enter a query face by using the UT to upload an image that includes the query face or to select an image that resides on the Internet or another network and that includes the query face. For example, the UT may allow the user to select an image stored in an online database, in an online photograph album or on a website.

Client 110 may be configured to receive from host 130 search result images that include faces that are perceptually similar to the query face. Client 110 also may be configured to present the search result images to the user by displaying the search result images in a UI.

The host 130 generally includes one or more devices configured to receive a query face and return search result images that include faces determined to be similar to the query face.

Host 130 also may be configured to generate and store similarity information that indicates human perception of facial similarity. The similarity information may be used to determine faces that are similar to the query face. Host 130 may be configured to provide to client 110 images that include faces similar to the query face as search result images.

Figure 2:
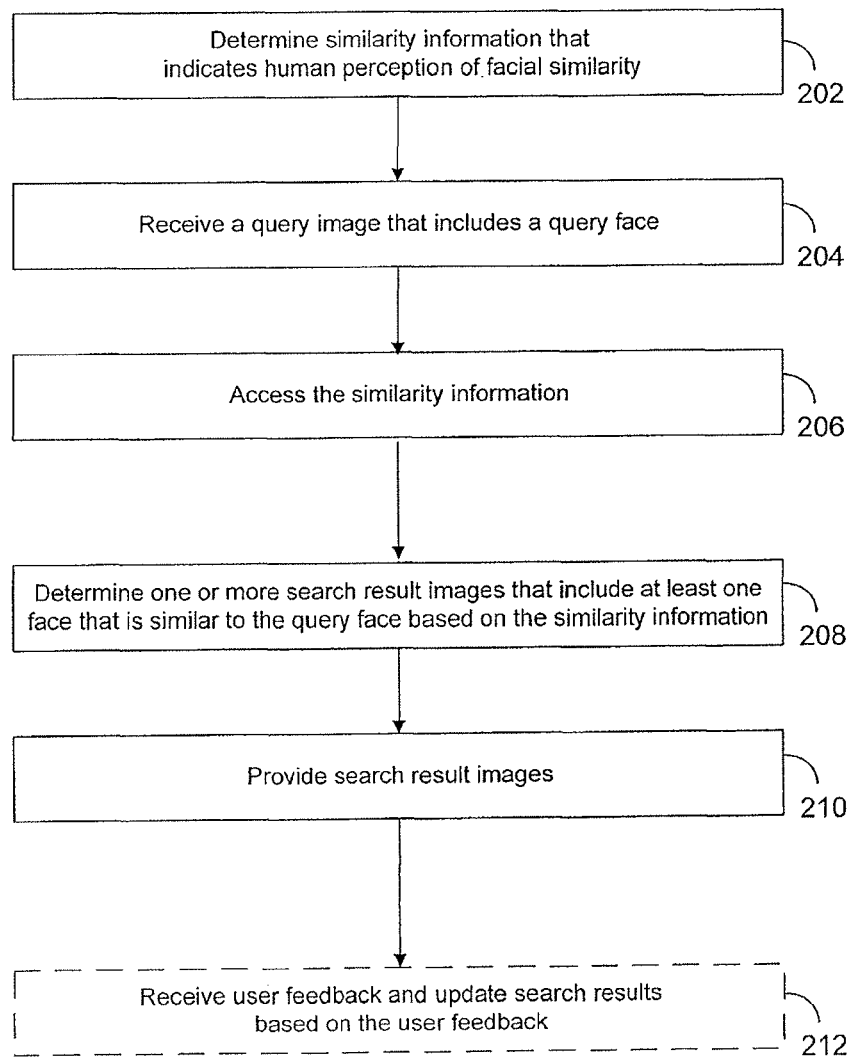

FIG. 2 is a flow chart illustrating an example of a general process 200 for determining similar faces within images based on human perception of facial similarity. Generally, the operations of process 200 may be used in conjunction with the systems and configurations described earlier in FIG. 1. For example, process 200 may be performed by host 130. For convenience, host 130 of FIG. 1 is referenced as performing the process. However, similar methodologies may be applied in other implementations where different components are used to define the structure of the system, or where the functionality is distributed differently among the components shown.

Initially, the host 130 determines similarity information that indicates human perception of facial similarity (202). To that end, the host 130 may obtain information related to human perception of facial similarity from one or more training users during a training stage. For example, a training user may be asked to react to a series of training images presented to the training user. A particular implementation of a process for determining similarity information is described below with respect to FIG. 3.

Next, the host 130 receives a query image that includes a query face (204). In some implementations, a user may provide a query image that includes a query face through a UI presented by client 110. The query image may reside on a user's personal computer or other device, such as, for example, a PDA or cell phone. In this example, the user may upload the image using the UI. In another example, the query image may already reside on the Internet, such as, for example, in a virtual hard drive, a digital photograph album or on a website. Additionally, or alternatively, the user may provide the query image by another method, such as, for example, sending the query image attached to an e-mail message or short message service (SMS) text message, or as part of a multimedia messaging service (MMS) message.

Upon receiving the query image, the host 130 accesses the similarity information determined in operation 202 (206) and determines one or more search result images that include at least one face that is similar to the query face based on the similarity information (208). To that end, the host searches a set of search images that include search faces to find those images that contain faces perceptually similar to the query. The host 130 may search all, or a subset of, the search images. Particular implementations of a process for determining search result images are described below with respect to FIGS. 5 and 6.

Once the search result images are determined, the host 130 provides the search result images to the user (210). For example, the host 130 may transmit a web page that includes the search result images to the client 110, or the host 130 may transmit the images directly to the client 110. The client 110 then may present the images to the user.

Once host 130 has provided the search result images to the user, host 130 may optionally receive user feedback from the user based on whether the user actually finds the search result images to include faces that are perceptually similar to the query face (212). The user feedback may be used by host 130 to provide different search result images for the query face (212). Typically, the different search result images are provided to the user immediately, but this need not be so.

In general, FIGS. 3-8 illustrate particular examples of processes that may be used to implement aspects of the process 200. In these examples, faces are represented by feature vectors. A feature vector is a series of values, where each value represents information about a particular feature of the face. The features may relate to shapes (referred to as geometry) or appearance (referred to as photometry) of individual facial features, or the entire face, such as, for example, eye color, nose width, distance between the eyes, skin tone, or other functions of the pixel intensities of the face. For example, features may have a value derived from a set of pixel intensities associated with a particular location on a face. The features also may include non-face based features, such as clothing patterns and colors, background shapes and body proportions.

There a number of techniques for obtaining feature vectors from a face. For example, one common approach is to transform a set of training face images into a small set of characteristic feature images, known as eigenfaces, where these eigenfaces are the principal components of this training set of face images, and then to represent new face images as a function of these eigenfaces. This technique is described in Turk, Matthew A. and Alex P. Pentland, "Face Recognition Using Eigenfaces," Vision and Modeling Group, The Media Laboratory, Massachusetts Institute of Technology, 1991. Furthermore, techniques for obtaining feature vectors are also described in U.S. patent application Ser. No. 11/382,671, filed May 10, 2006, and titled "Using Relevance Feedback in Face Recognition."These techniques also may be used to obtain the various feature vectors described with respect to FIGS. 3-8.

Furthermore, in these examples, similarity between two faces is generally based on a distance between the respective feature vectors representing the faces. Faces may be designated as similar to the query face when their respective feature vectors are within a pre-selected distance of the query face feature vector. In some implementations, the degree of similarity may be indicated by the value of the distance, with closer vectors indicating more similar faces than vectors that are farther away. In addition, to take human perception of facial similarity into account, the examples below obtain information from human training users about their perception of facial similarity and use this information to determine a mapping function that maps between an objective feature space and a psychological feature space. The mapping function is applied to the feature vectors and then the distances are calculated to determine similar faces, or the distance between the feature vectors is calculated and the mapping function is applied to the determined distances.

Figure 3:
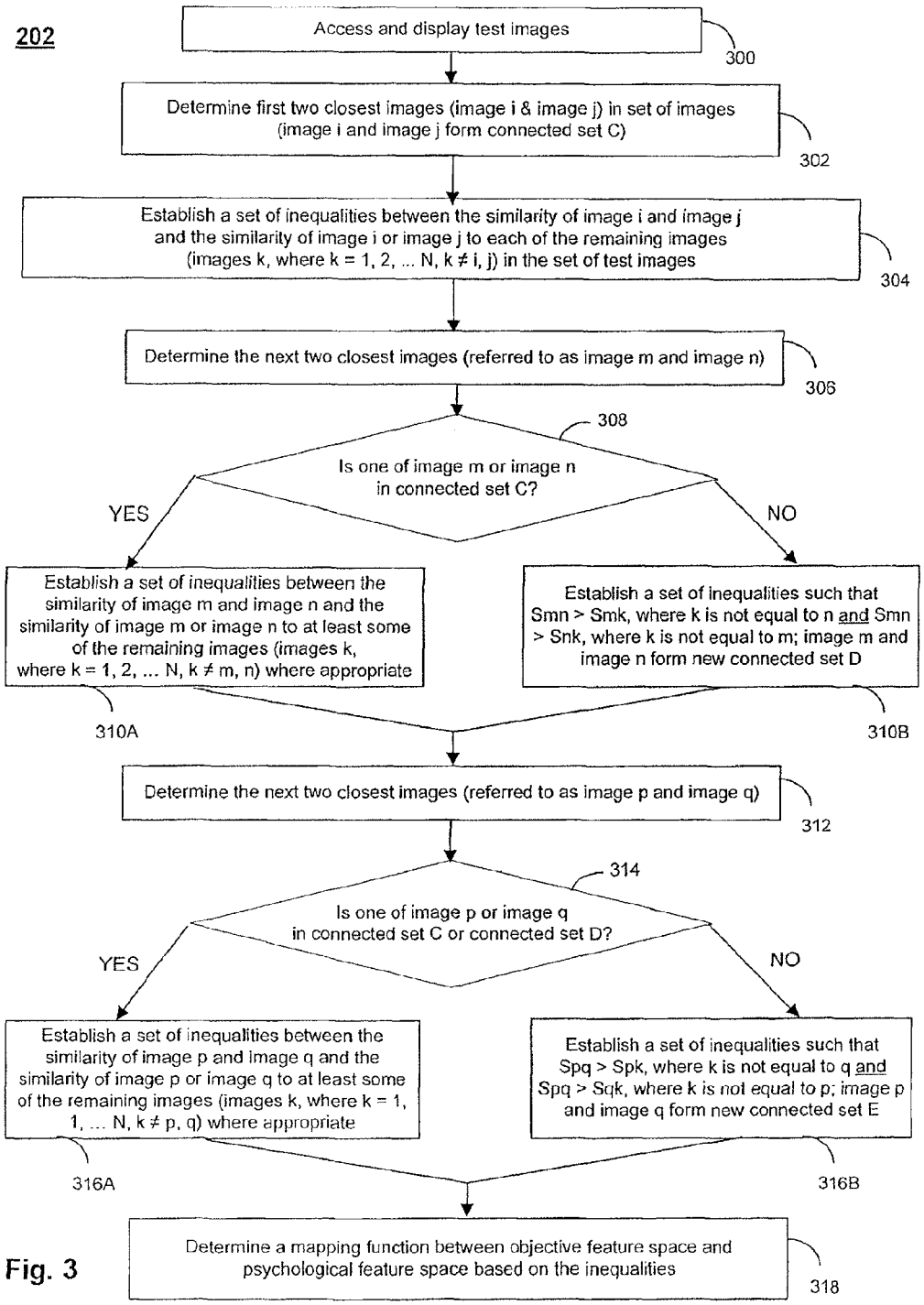

FIG. 3 is a flow chart that represents a particular implementation of operation 202 of FIG. 2. Process 202 also may be performed by host 130 of FIG. 1.

In the implementation shown in FIG. 3, the similarity information is determined based on a set of inequalities that represent the relative similarity between training faces in a set of training images. The inequalities are generally determined by showing the images to one or more training users and requesting the training users to indicate which faces are more similar. To begin process 202, host 130 accesses a set of training images and displays them to a training user (300).

Host 130 then requests that the training user select the two most similar faces (it is assumed for this discussion that there is one face per training image) in the set of images, which are referred to as image i and image j (and which form a connected set C) (302). Based on the user's selection, host 130 establishes a set of inequalities between the similarity of image i and image j and the similarity of image i or image j to each of the remaining images (images k, where k=1, 2, ... N, k≠i, j) in the set of images (304). An inequality indicates that two images are closer (or more similar) than two other images. For example, face x may be more similar to face y than to face z and face y may be more similar to face x than to face z. In this example, the inequality may indicate that the similarity (S) of face x to face y is greater than the similarity (S) of face x to face z, or $S_{xy} > S_{xz}$, and the similarity (S) of face x to face y is greater than the similarity of face y to face z, or $S_{xy} > S_{yz}$.

The inequalities established indicate that image i and image j are closer than image i and image k or image j and image k, where image k represents the other images in the set of images. Thus, $S_{ij} > S_{ik}$, where k=1, 2, ... N, where k≠j, and $S_{ij} > S_{jk}$, where k=1, 2, ... N, where k≠i.

Host 130 requests that the user select the next two closest images, referred to as image m and image n from the set of images (306). Host 130 then determines if one of image m or image n is in connected set C (308). For example, if face x (image i) and face y (image j) are the first two closest faces, and face x (image m) and face z (image n) are the next two closest images, face x is already present in connected set C because face x is both image i and image m.

If so, host 130 establishes a set of inequalities between the similarity of image m and image n and the similarity of image m or image n to at least some of the remaining images (images k, where k=1, 2, ... N, k≠m, n) where appropriate (310A). For example, if image m is in connected set C (e.g., image n is the same as image i or image j), host 130 establishes the following inequalities:

$S_{mn} > S_{mk}$, where k≠n, and k is not in connected set C, and $S_{mn} > S_{nk}$, where k≠m.

Alternatively, if image n is in connected set C (e.g., image n is the same as image i or image j), host 130 establishes the following inequalities:

$S_{mn} > S_{mk}$, where k≠n, and $S_{mn} > S_{nk}$, where k≠m, and k is not in connected set C.

If neither image m nor image n are in connected set C, image m and image n form a connected set D and host 130 establishes the following set of inequalities (310B):

$S_{mn} > S_{mk}$, where k≠n, and $S_{mn} > S_{nk}$, where k≠m.

Host 130 requests that the training user select the next two closest images from the set of images, which are referred to as image p and image q (312). Host 130 determines if one of image p or image q is in any already created connected set, such as connected set C or connected set D (314). For example, if face x (image m) and face y (image n) are the second two closest faces, and face x (image p) and face z (image q) are the next two closest images, face x is already present in connected set D because face x is both image m and image p.

If so, host 130 establishes a set of inequalities between the similarity of image p and image q and the similarity of image p or image q to at least some of the remaining images (images k, where k=1, 1, ... N, k≠p, q) where appropriate (316A). For example, if image p is in connected set D (e.g., image p is the same as image m or image n), host 130 establishes the following inequalities:

$S_{pq} > S_{pk}$, where k≠q, and k is not in connected set D, and $S_{pq} > S_{qk}$, where k≠p.

Alternatively, if image q is in connected set D (e.g., image q is the same as image m or image n), host 130 establishes the following inequalities:

$S_{pq} > S_{pk}$, where k≠q, and $S_{pq} > S_{qk}$, where k≠p, and k is not in connected set D.

Similarly, if image p is in connected set C (e.g., image p is the same as image i or image j), host 130 establishes the following inequalities:

$S_{pq} > S_{pk}$, where k≠q, and k is not in connected set C, and $S_{pq} > S_{qk}$, where k≠p.

Alternatively, if image q is in connected set C (e.g., image q is the same as image i or image j), host 130 establishes the following inequalities:

$S_{pq} > S_{pk}$, where k≠q, and $S_{pq} > S_{qk}$, where k≠p, and k is not in connected set C.

If neither image p nor image q are in connected set C or connected set D, image p and image q form a new connected set (e.g., connected set E) and host 130 establishes the following set of inequalities (316B):

$S_{pq} > S_{pk}$, where k≠q, and $S_{pq} > S_{qk}$, where k≠p.

The operations of FIG. 3 represent an example where a limited number of faces or images are in the set of training images, thus limiting the number of inequalities that may be established, or an example where less than all possible inequalities are purposefully established. In some implementations, the operations described may determine a sufficient number of inequalities. However, in some implementations, if more faces or images exist in the set of training images, or it is desirable to establish a larger number of inequalities, additional operations similar to those described with respect to FIG. 3 may be performed by host 130. For example, the next two closest images (perhaps referred to as image s and image t) may be determined, host 130 may determine if either image s or image t is in an already-created connected set, and depending on the determination, a number of inequalities may be established in the manner described above. The same may be true for the further next two closest images, and so on.

Host 130 may repeat such operations in the manner described. The operations may be repeated either until no more inequalities can be obtained or until a desired number of inequalities, perhaps less than all possible, have been obtained.

In some implementations, instead of simply determining inequalities between images in the connected sets, host 130 may determine actual distances between the images in the set of images. For example, rather than determining that face x is more similar to face y than to face z, and thus face x may be conceptually closer to face y than to face z in a connected set, host 130 may calculate a distance of 1 between face x and face y, but a distance of 3 between face x and face z.

Operations 300-316B illustrate one implementation for determining inequalities between training images. However, other approaches also may be used. For example, the training users may be presented with three images and asked to indicate which two images of the trilogy include faces that are most similar, the training users may be presented with every image in the training set and asked to compare every face in each image with every other face in the image set (by, for example, assigning numbers indicating how similar (or dissimilar) the faces are to one another), or two training users may be asked to compare two pairs of randomly selected images having faces to determine which faces are more similar.

Reactions to the training images may be obtained from more than one training user, and host 130 may combine the reaction data received from the training users. For example, a voting system may be used such that if two out of three training users indicated that face x and face y are more similar to one another than face x and face z, thereby creating the inequality $S_{xy}>S_{xz}$, then values associated with the inequality (e.g., distortions) may be weighted by a value. The value may be a fraction that represents a number of training users who indicated face x and face y were more similar divided by a total number of training users who have judged the set of faces. In the present example, the fraction may be ⅔. The weight determined may be applied as described in detail below.

In another example, a majority rules system may be used. Again, if two out of three training users indicated that face x and face y are more similar to one another than face x and face z, creating the inequality $S_{xy}>S_{xz}$, the majority may rule. In this system, information related to similarity among faces indicated by a majority of the training users may be used, while information related to similarity among faces indicated by a minority of the training users may be discarded. In the present example, the inequality $S_{xy}>S_{xz}$, as determined by a majority of the training users, may be used by host 130 to represent the relative similarity between faces x, y and z, while the alternate inequality $S_{xz}>S_{xy}$, as determined by a minority of training users, may be discarded and not used by host 130 to represent the relative similarity between faces x, y and z.

In yet another example, the reaction data may be averaged. This implementation may require that a determination of similarity between two faces is based on a distance determined between feature vectors representing the two faces. An indication of similarity between two faces provided by the training user may be translated into a distance between the two faces and represented as a number. Thus, if more than one training user indicates similarity between the same two faces, more than one distance between the two faces may be determined. The determined distances may be averaged by host 130 to form a single value, or distance, between the two faces that represents the indication of similarity provided by the more than one training users. The single value then may be used by host 130 to represent the relative similarity between two or more faces.

The voting system, majority rules system and averaging are examples of techniques to combine reactions of more than one training user to the training images. However, other methods also may be used to combine the reaction data received from multiple training users.

Once the inequalities (single or combined) are determined, host 130 determines a mapping function between an objective feature space and a psychological feature space based on the inequalities (or actual distances, if determined) (318). In general, the mapping function maps objective feature vectors (those originally formed from the actual facial features), which are represented in an objective feature space, into psychological feature vectors that are represented in a psychological feature space. The mapping function alternatively may map distances between objective feature vectors into a psychological feature space. The mapping function also may take into account any weights determined based on reactions to the training images having been obtained from more than one training user.

The objective feature space represents an objective degree of similarity between two faces. The psychological feature space represents a subjective degree of similarity between two faces. The subjective degree of similarity is based on human perception of facial similarity. For example, two faces may both include brown hair, blue eyes, small ears, and a pointy chin. However, the two faces may have drastically different shaped noses. In this way, the two faces may be objectively similar. However, human perception of facial similarity may indicate that hair and eye color are less important to a finding of similarity than similarly shaped noses. Thus, a human, e.g., a training user, may find that the two faces in the present example are not similar. The human perception of facial similarity (e.g., high importance of nose shape and low importance of hair and eye color) may be taken into account by the mapping function based on the reactions to training images by the training users during the training phase.

Figure 4:
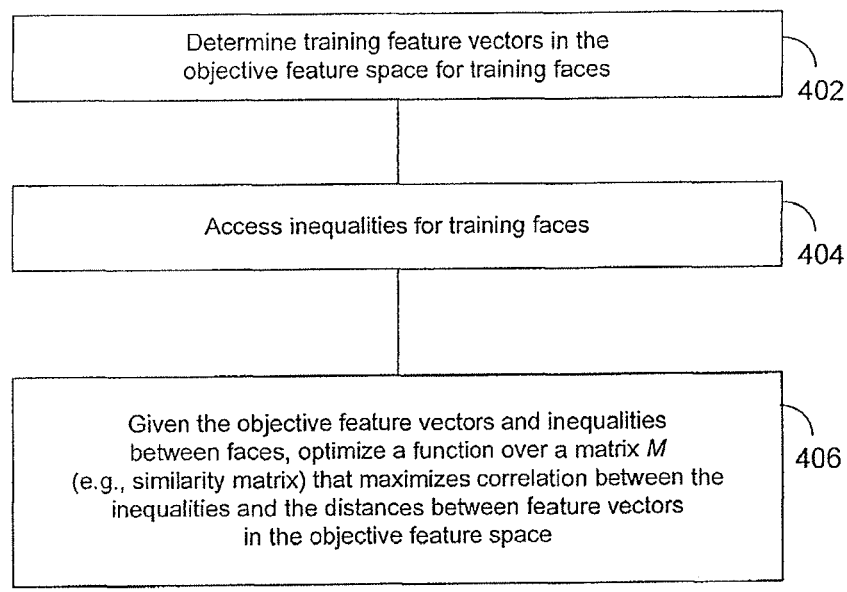

FIG. 4 is a flow chart that represents a particular implementation of operation 318 of FIG. 3. Process 318 also may be performed by host 130 of FIG. 1.

The host 130 determines training feature vectors in the objective feature space for training faces in the training images (402). In other words, the host 130 determines feature vectors that are related to the objective features of the faces and not related (at least not yet) to human perception of facial similarity. The feature vectors determined by host 130 in this operation may be referred to as training feature vectors because the feature vectors may be used to create a mapping between the objective feature space and the psychological feature space. In general, the distance between the feature vectors in the objective feature space represents the amount of objective similarity between faces in the training images.

In some implementations, host 130 may dynamically generate a feature vector for a face when a request for similar faces is received. Additionally, or alternatively, host 130 may generate a feature vector for a face before the request is received and the feature vectors may then be stored. For example, host 130 may generate a feature vector when the face is added to an image database, such that the database may store the images and feature vectors associated with the faces in the images. In this configuration, host 130 need only access, rather than generate, the training feature vector for the faces in the training images during this operation.

The host 130 also accesses the inequalities that represent the human perception of similarity between the faces in the training images (404). In other implementations, instead of simple inequalities, the distances between training faces in the trainings images may be used if the distances are determined.

Given the objective feature vectors and the inequalities, host 130 optimizes a function over a matrix M (referred to as a similarity matrix) that maximizes the correlation between the inequalities and the distances between feature vectors in the objective feature space (406). For example, the host 130 may determine the value of M that minimizes the following function:

$$D = \frac{-1}{N} \sum_{faces\ k}^{N} \frac{\sum_{s_{ki} > s_{kj}} Dist < Mx_k, Mx_j > - Dist < Mx_k, Mx_i >}{\sum_{s_{ki} > s_{kj}} |Dist < Mx_k, Mx_j > - Dist < Mx_k, Mx_i >|}$$

where x represents the feature vectors, $S_{ki}$ represents the similarity between faces k and i, $S_{ki} > S_{kj}$ indicates that face k and face i are more similar to one another than face k and face j, and Dist $<Mx_k, Mx_j>$ indicates the distortion (or distance) between the feature vector associated with face k and the feature vector associated with face j after the feature vectors have each been mapped to the psychological space using matrix M.

Similarity matrix M also may take into account any weights determined based on reactions to the training images having been obtained from more than one training user. The weight (W) related to an indication that more training users thought faces k and i were more similar than faces k and j may be applied to the function as follows.

$$D = \frac{-1}{N} \sum_{faces\ k}^{N} \frac{\sum_{s_{ki} > s_{kj}} W_{s_{ki} > s_{kj}} (Dist < Mx_k, Mx_j > - Dist < Mx_k, Mx_i >)}{\sum_{s_{ki} > s_{kj}} W_{s_{ki} > s_{kj}} |Dist < Mx_k, Mx_j > - Dist < Mx_k, Mx_i >|}$$

where $W_{s_{ki} > s_{kj}}$, for example, is a fraction that represents the number of training users who indicated that face k and face i were more similar than face k and face j divided by the number of total training users who rated the three faces k, i and j.

In this case, the similarity matrix M maps objective feature vectors into the psychological space. As an alternative, the host 130 may determine a similarity matrix M that maps the distances between objective feature vectors into the psychological space. For example, the host 130 may determine the value of M that minimizes the following function:

$$D = \frac{-1}{N} \sum_{faces\ k}^{N} \frac{\sum_{s_{ki} > s_{kj}} M[D_{kj} - D_{ki}]}{\sum_{s_{ki} > s_{kj}} |M[D_{kj} - D_{ki}]|}$$

where $D_{kj}$ represents a matrix of Dist $<x_i-x_j>$, such that each element in $D_{kj}$ is the distance between corresponding elements of $x_k$ and $x_j$ and thus $D_{kj\_lm}$=Dist $<x_{k\_lm}, x_{j\_lm}>$ and $M[D_{kj}-D_{ki}]$ indicates a matrix multiply between matrix M and the matrix $[D_{kj}-D_{ki}]$.

These functions may be optimized over M using numerical optimization methods. For example, the conjugate gradient method may be employed. This method is described, for example, in Press et al., "Numerical Recipes in C: The art of scientific computing," Cambridge University Press.

The distance between feature vectors (either objective feature vectors or mapped feature vectors) may be measured by a variety of metrics. For example, a Euclidean distance may be used. In general, the Euclidean distance between two feature vectors may be determined by using the formula $$D = \sqrt{(A_1-B_1)^2 + (A_2-B_2)^2 + \ldots + (A_n-B_n)^2}$$

where the two feature vectors are feature vector A and feature vector B, with each having n features, such that the features of each feature vector may be designated with the vector name (e.g., A) and a subscript indicating which feature number is being referenced (e.g., $A_1$ refers to the first feature in feature vector A).

Figure 5:
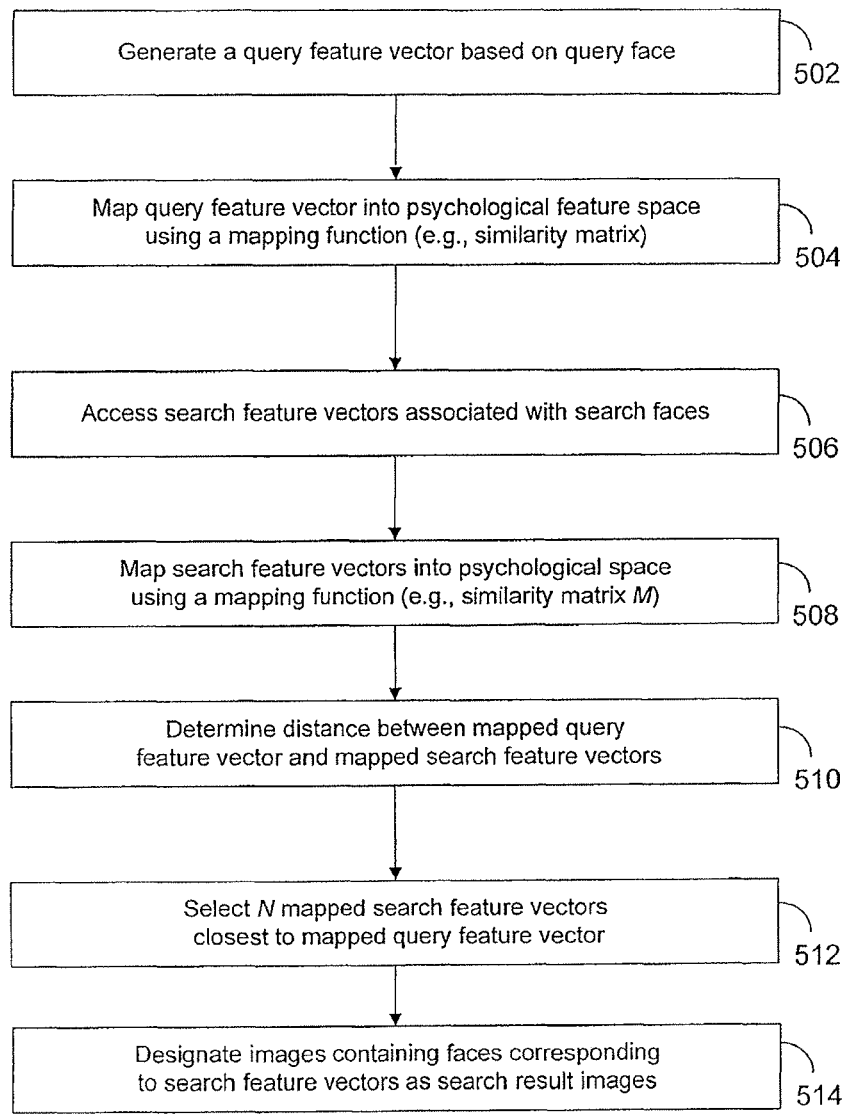

FIG. 5 is a flow chart for a process 208a that represents a particular implementation of operation 208 of FIG. 2. This particular implementation uses a mapping function (e.g., a similarity matrix M) that maps objective feature vectors into psychological feature vectors. Process 208a also may be performed by host 130 of FIG. 1.

Host 130 generates a query feature vector based on a query face (502). The query feature vector includes a series of values, where each value corresponds to a particular feature of the query face.

Host 130 maps the query feature vector into psychological feature space using a mapping function (504). For example, a similarity matrix M that maps objective feature vectors into psychological feature vectors may be used by multiplying the similarity matrix M by the query feature vector. In other words, if q represents the query feature vector in the objective feature space and $p_q$ represents the query feature vector in psychological feature space, then $p_q$ may be calculated by $$p_q = Mq$$

Host 130 also accesses a set of search feature vectors associated with search faces (506). Search faces are the faces that are potentially similar to the query face. As with the training feature vectors, the search feature vectors may be generated dynamically when a request is received, or may be generated and stored beforehand with the host 130 accessing the search feature vectors during this operation.

Host 130 then maps the search feature vectors into psychological space using a mapping function (508). For example, a similarity matrix M that maps objective feature vectors into psychological feature vectors may be used by multiplying the similarity matrix M by each feature vector. In other words, where x represents a search feature vector in objective feature space and $p_x$ represents the corresponding psychological feature vector, the psychological feature vector $p_x$ may be calculated by $$p_x = Mx$$

Once the host 130 determines the mapped query feature vector and the mapped search feature vectors, the host 130 determines the distance between the mapped query feature vector and the mapped search feature vectors (510). The host 130 may determine the distance between the query feature vector and the search feature vectors using the Euclidean distance described above.

After determining the distances between the mapped query feature vector and the mapped search feature vectors, the host 130 selects the N mapped search feature vectors that are closest to the mapped query feature vector (512). N is the number of faces that are determined to be similar to the query face due to the proximity of the search face to the query face in the psychological space. The value of N may be a pre-set value, or may be dynamically determined during the search.

Lastly, the host 130 designates the images that contain the faces corresponding to the N selected search feature vectors as the search result images (514). In doing so, the host 130 may rank the similarity of the N faces to the query face based on the distances of their corresponding mapped search feature vectors to the mapped query search feature vector.

Figure 6:
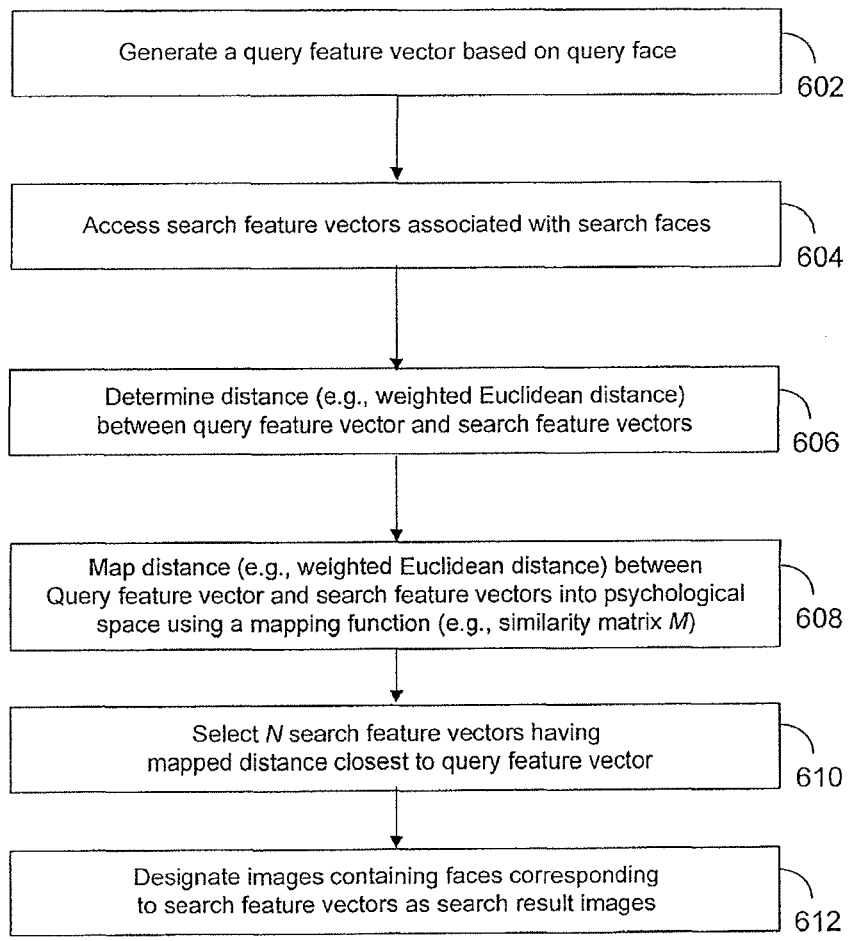

FIG. 6 is a flow chart for a process 208b that represents a particular implementation of operation 208 of FIG. 2. This implementation uses a mapping function that maps distances between objective feature vectors into a psychological feature space. Process 208b also may be performed by host 130 of FIG. 1.

Host 130 generates a query feature vector in the objective feature space based on the query face (602) and accesses a set of search feature vectors (represented in the objective feature space) that are associated with search faces (604).

Host 130 determines a distance (e.g., a Euclidean distance) between the query feature vector and the search feature vectors (606). In this configuration, host 130 determines the distance between the query feature vector and a search feature vector while the two feature vectors remain in the objective space (that is, instead of mapping the feature vectors and then determining the distance between mapped vectors, as discussed above with respect to FIG. 5). The Euclidean distance may be weighted or unweighted.

Host 130 maps the distance (e.g., the Euclidean distance) between the query feature vector and the search feature vectors into psychological space using the mapping function (e.g., similarity matrix M) (608). In this configuration, the Euclidean distance is mapped from the objective space into the psychological space, rather than mapping the individual feature vectors from the objective space to the psychological space.

Host 130 selects N search feature vectors having a mapped distance closest to the query feature vector (610). N is the number of faces that are determined to be similar to the query face due to the proximity of the mapped distance between the search face to the query face. The value of N may be a pre-set value, or may be dynamically determined during the search.

Lastly, the host 130 designates the images that contain the faces corresponding to the N selected search feature vectors as the search result images (612). In doing so, the host 130 may rank the N faces based on the distances of their corresponding mapped search feature vectors to the mapped query search feature vector.

Figure 7:
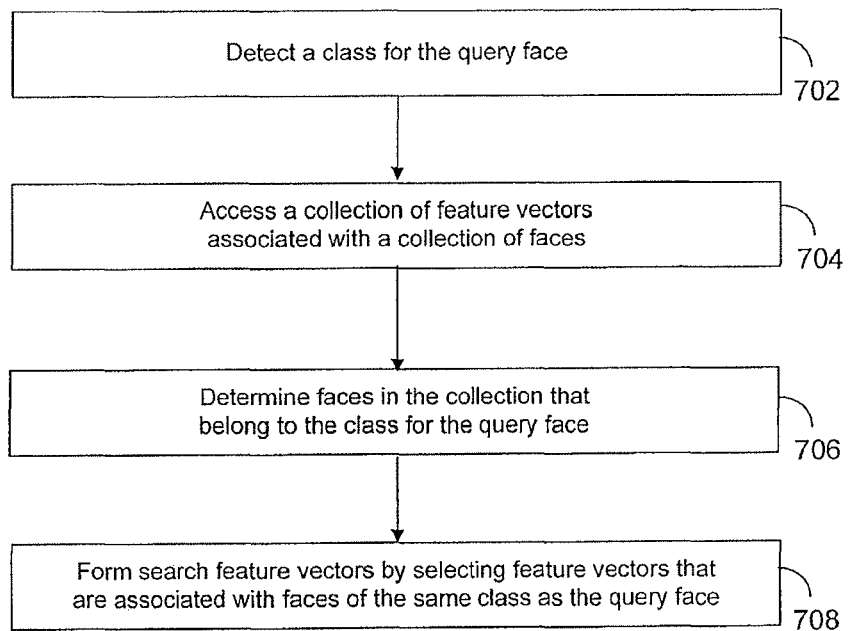

FIG. 7 is a flow chart of a process 700 for removing certain search feature vectors from consideration during the search, as implemented, for example, by process 208a or 208b. Process 700 also may be performed by host 130 of FIG. 1, and may be used to determine the set of search feature vectors that are accessed, for example, in operation 506 of process 208a or in operation 604 of process 208b.

In general, process 700 may be used to eliminate those faces that will not be of interest to the user. For example, an online dating service generally may ask a user to input text-based information that describes objective characteristics about the person they are seeking, e.g., gender, age, geographic location, and profession. In such a situation, if the faces being searched do not also match the other criteria, it may be more efficient to eliminate them from the set of faces searched. Similarly, some characteristics may be dispositive as to whether one face is similar to another. For example, a female face may be designated as not being similar to male faces. Examples of other characteristics that may be used include skin tone, and hair color or type (e.g., curly, straight).

In this case, the host 130 detects a class for the query face (702). The class includes the particular features or attributes that may eliminate certain faces from searching or may cause a dispositive result for whether a face of the particular class is, or is not, similar to the query face. For example, a user may seek females who look like the actress Nicole Kidman. Thus, the query face class is female.

Host 130 accesses a collection of feature vectors associated with a collection of faces (704). The feature vectors accessed may be a super-set of faces that are potentially similar to the query face. In the present example, faces of all classes may be accessed.

Host 130 determines faces in the collection that belong to the class for the query face (706). In the present example, faces that belong to the female class may be determined.

Host 130 forms a set of search feature vectors by selecting feature vectors that are associated with faces of the same class as the query face (708). More particularly, only feature vectors associated with faces of the same class as the query face (here, the female class) are included as search feature vectors and thus may be considered as potentially similar to the query face. In this configuration, search result images may be of better quality (e.g., more likely to be similar based on human perception of facial similarity) or the search for similar faces may be more efficient because faces having a class that is different from the class for the query face may automatically be removed from consideration.

FIG. 8 is a flow chart that represents a particular implementation of operation 212 of FIG. 2 for updating the search results based on user feedback. Process 212 also may be performed by host 130 of FIG. 1.

Host 130 may provide a user with search result images and a user interface configured to receive feedback from the user regarding the similarity of the faces in the search result images to the query face (802). The user is the same user who provided the query image and requested the search for images containing similar faces. The search result images may be those images designated as having faces that correspond to the N search feature vectors as described above with respect to FIGS. 5 and 6. The user interface (UI) provided to the user for receiving the user feedback may be any of UIs 1000, 1100 or 1200, of FIGS. 10-12, respectively, described in detail below. In general, once user feedback is received, the search results may be updated based on the feedback.

Host 130 may receive user feedback via the user interface (804). The user feedback may be an indication of which search result images have faces that are similar to the query face and which do not. This type of feedback may be received explicitly or implicitly. For example, the user may explicitly indicate that a particular search result image does not include a face that the user finds similar to the query face. The feature vector associated with this poor search result image may be designated as a negative feature vector. In contrast, when the user explicitly indicates that a particular search result image does include a face that the user finds similar to the query face, the feature vector associated with that search result image may be designated a positive feature vector.

Implicit feedback also may be received by host 130 based on the user's actions with respect to the search result image. For example, if a user requests faces that are similar to the celebrity Nicole Kidman while using an online dating application and the user selects a particular search result image to, for example, view the face in a larger size or read accompanying profile information, this action by the user may imply that the user finds the particular search result image to be similar to the query face of Nicole Kidman. Thus, host 130 may designate the feature vector associated with the particular search result image as a positive feature vector. The opposite also may be true if a user does not select a particular search result image.

In another example, rather than indicating that a particular search result image does or does not include a face that the user finds similar to the query face, the user also may request a new search with a new query face (which may imply that none of the search result images include a similar face). In yet another example, the user may indicate specific facial features of the faces in the search result images that are, or are not, similar enough to the query face in order to receive more responsive search results via a new search.

Based on the particular user's perception of facial similarity, which is determined by the user feedback, host 130 may update the search results using this feedback (806). To that end, host 130 may use the positive and/or negative vectors to determine which features are good or bad discriminators of similarity, and re-run process 208a or process 208b using appropriately weighted versions of those features or the distances between those features.

For example, if a certain feature, such as, for example, the distance between the eyes, is found to be particularly helpful in determining similarity between two faces based on human perception of facial similarity, the distance between the corresponding feature in the query and search features may be weighted more than other features when re-running process 208a or process 208b. The weighting may be applied in the objective feature space or the psychological feature space, depending on whether the distance or vectors are mapped. Weighting a particular feature may cause two faces having similar values for the particular feature to be deemed similar even if no other, or very few other, features have values that are close. Weighting the particular feature also may cause a first face to be deemed similar to a second face when the first and second faces have close values for just the particular feature, while the first face may be deemed not similar to a third face even though the number of features that are similar (e.g., have close feature values) among the first and third faces may be more, but the features that are similar are not as important (e.g., not weighted highly) as the particular feature.

To determine feature weights, the host 130, may, for example calculate a standard deviation for each feature value i ($\sigma_i$, where i=1, i+1, n) across the set of positive feature vectors. The weights for each feature value i ($w_i$) may then be assigned the inverse of the standard deviation, such that $w_i=1/\sigma_i$. Doing so adds a higher weight to those features that are more closely clustered around a particular value, which indicates the feature may be a good discriminator of similarity.

Upon determining the weights, the distance D between a feature value in a search feature vector and the corresponding feature value within the query feature vector may be multiplied by its associated weight when re-running process 208a or process 208b. Thus, $$D = \sqrt{\sum_{i=1}^{n} w_i(A_i - B_i)^2}$$

where $A_i$, i=1, i+1, n, corresponds to the feature components of the search feature vector and $B_i$, i=1, i+1, n, corresponds to the feature components of the query feature vector.

Similar techniques may be applied to the negative feature vectors, or the combination of positive and negative feature vectors, to obtain the weights $w_i$. Also, to the extent that weights are determined prior to determining the initial search results, such weights may be used in the initial run of process 208a or process 208b to obtain the initial search results.

In some implementations, user feedback may be used to update the similarity information such that future searches requested by the particular user may yield more responsive search result images. For example, the collection of positive and negative feature vectors may be used by host 130 to actually update the information related to distances or inequalities between images. For example, host 130 may re-set inequalities for images associated with feature vectors in the collection of positive feature vectors to reflect that those images are more similar (i.e., conceptually closer) than images associated with feature vectors in the collection of negative feature vectors.

In some implementations, the similarity matrix M may be updated directly based on the collections of positive and negative feature vectors. For example, host 130 may include additional inequalities (and corresponding feature vectors) based on the user feedback that would affect the values used in the summation to optimize M. In particular, although the search images and training images are different, the similarity inequalities and feature vectors related to faces that make up the collections of positive and negative feature vectors may be incorporated into the summation to optimize M. The collections of positive and negative feature vectors can be thought of as a new connected set for which a limited number of additional inequalities may be established. The additional inequalities may then be incorporated into the function for M and M then may be recomputed.

Figure 9:
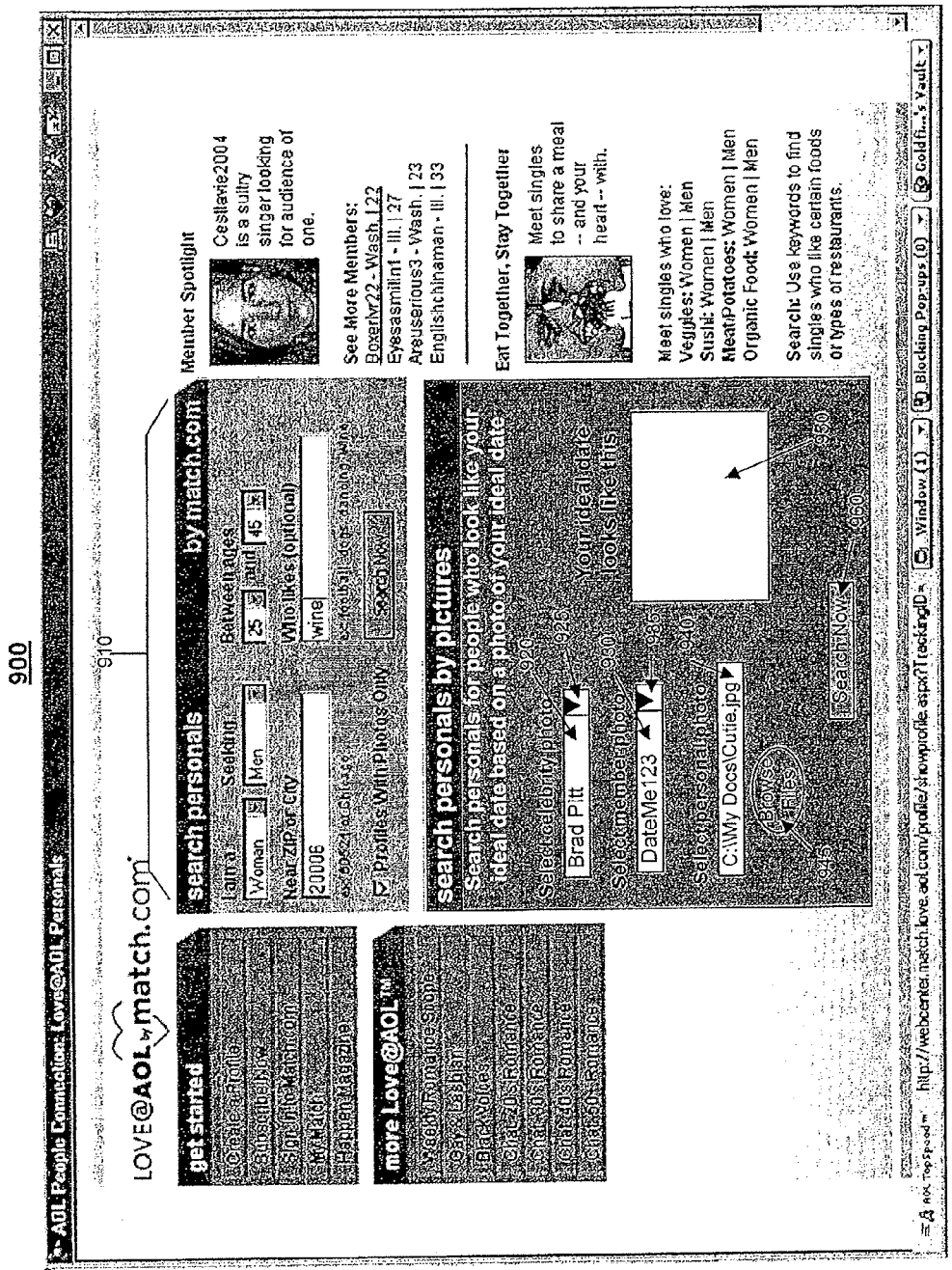
FIG. 9 is an example of a UI 900 configured to allow a user to provide a query face to initiate a search for faces that are similar to the query face in an online dating service application.

FIG. 9 is an example of a UI 900 configured to allow a user to provide a query face to initiate a search for faces that are similar to the query face in an online dating service application. UI 900 includes input fields 910 for providing general information regarding the type of person that the user is seeking. UI 900 also includes input fields 920-945 for a user to provide a query face, which may be displayed in display window 950, and initiate a search for images that contain faces that are similar to the provided query face.

More particularly, UI 900 includes input fields 910 where a user may indicate, for example, the user's gender (e.g., woman) and the gender (e.g., men) and age (25 to 45) of the type of person that the user is seeking. Input fields 910 also include an indication of the user's location by zip code or city (e.g., 20006) and any optional attributes the user wishes to find (e.g., someone who enjoys wine).

To provide a query face and initiate a search for images that have faces that are similar to the query face, a user may supply the information requested in input fields 920-945. For example, a user may select a photograph of a celebrity by clicking on drop down menu 925. In this example, the user has selected a photograph of Brad Pitt as indicated in field 920. Alternatively, a user may select a photograph of a particular member of the online dating service by clicking on drop down menu 935. In this example, the user has selected the photograph of a member having an alias of DateMe123 as indicated in field 930. Alternatively, a user may select a personal photograph as the query image by either typing in the location of the photograph into field 940 or browsing the user's files (either on the user's hard drive, on a virtual hard drive or in an online photograph album) by selecting button 945. In this example, the user has selected a photograph located on the user's C: drive in the My Docs folder and entitled Cutie.jpg as indicated in field 940.

Once a photograph has been selected, the user may view the image in display window 950. If the photograph is not the one the user wishes to use as a query image including a query face, the user may select another photograph in the manner described above. The user then may search for faces that are similar to the query face included in the provided image by selecting Search Now button 960.

Figure 10:
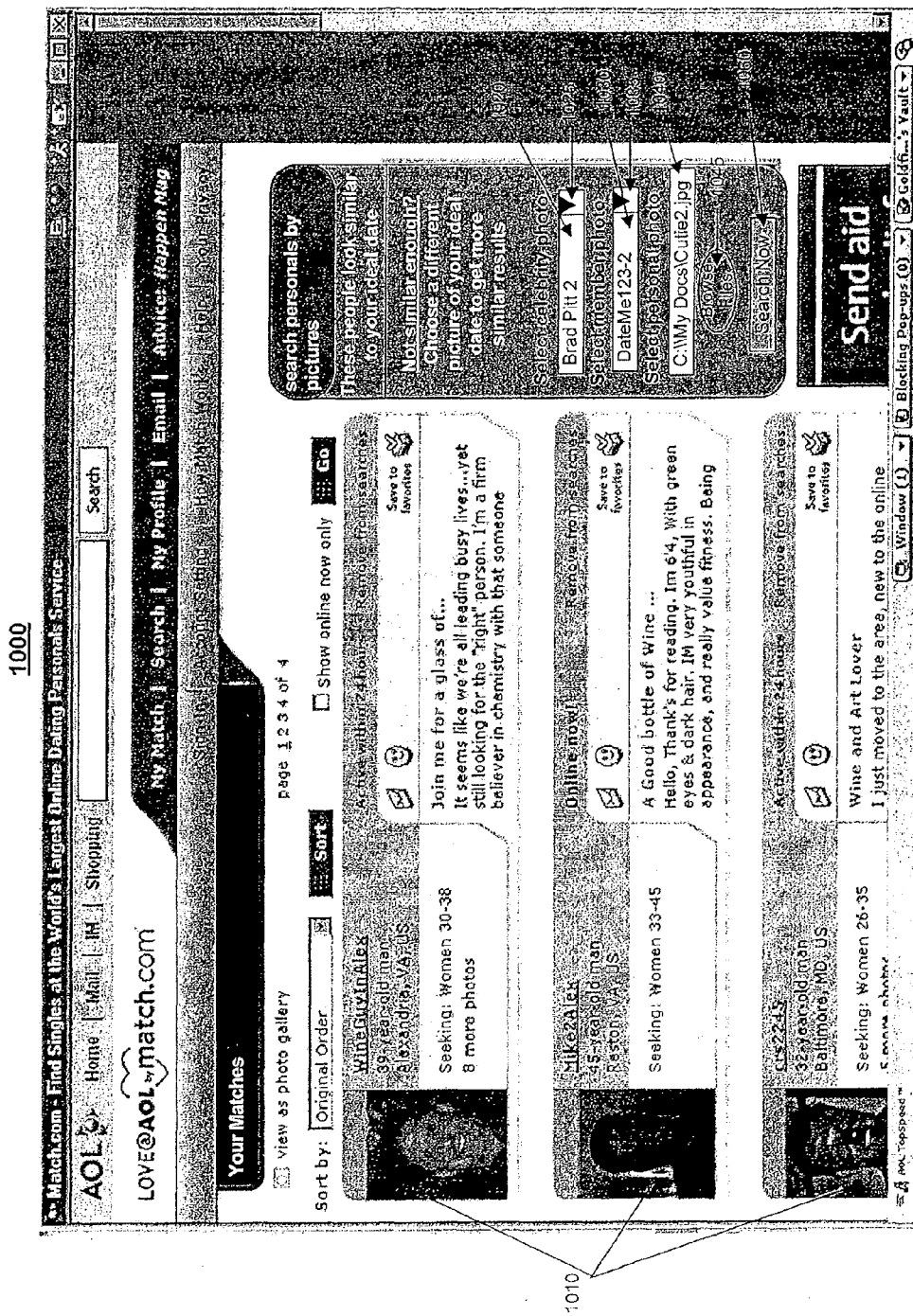
FIG. 10 is an example of a UI 1000 showing search result images and being configured for a user to initiate a second search for similar faces by providing a second query face.

FIG. 10 is an example of a UI 1000 showing search result images and being configured for a user to initiate an additional search for similar faces by providing an additional query face.

UI 1000 includes search result images (and profile information) 1010. UI 1000 also includes input fields 1020-1045 and Search Now button 1060 which are similar to input fields 920-945 and Search Now button 960 of FIG. 9. A user may be dissatisfied with the search result images provided in response to the user's search for faces that are similar to the query face in, for example, a photograph provided by the user. In this case, the user may provide an additional query image and initiate an additional search. The second query image may be another photograph of the same person or a photograph of a different person also having traits that are similar to those of the type of person that the user is seeking.

Figure 11:
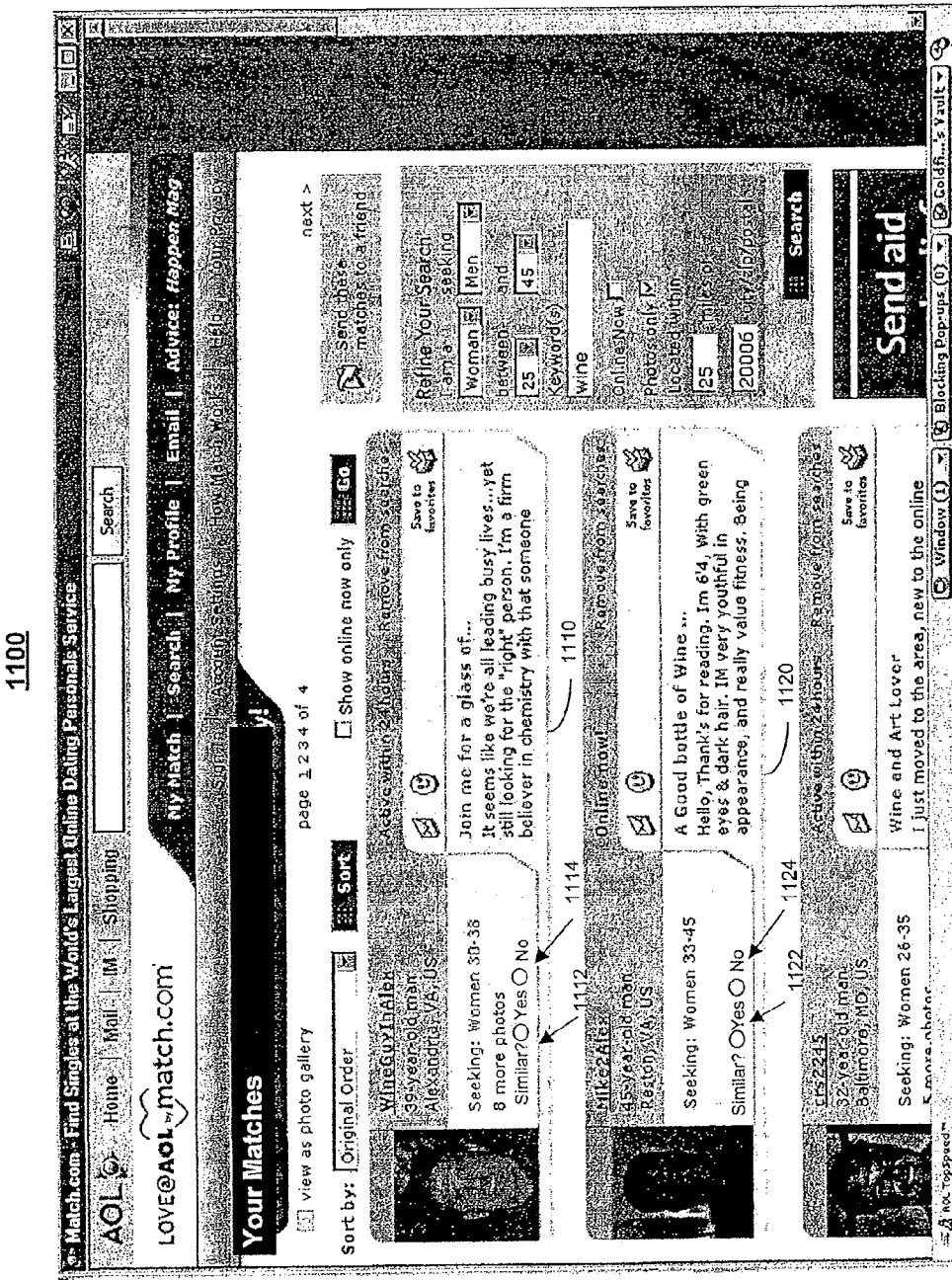
FIGS. 11 and 12 are examples of UIs 1100 and 1200 configured to allow a user to provide user feedback about the search result images.
Figure 12:
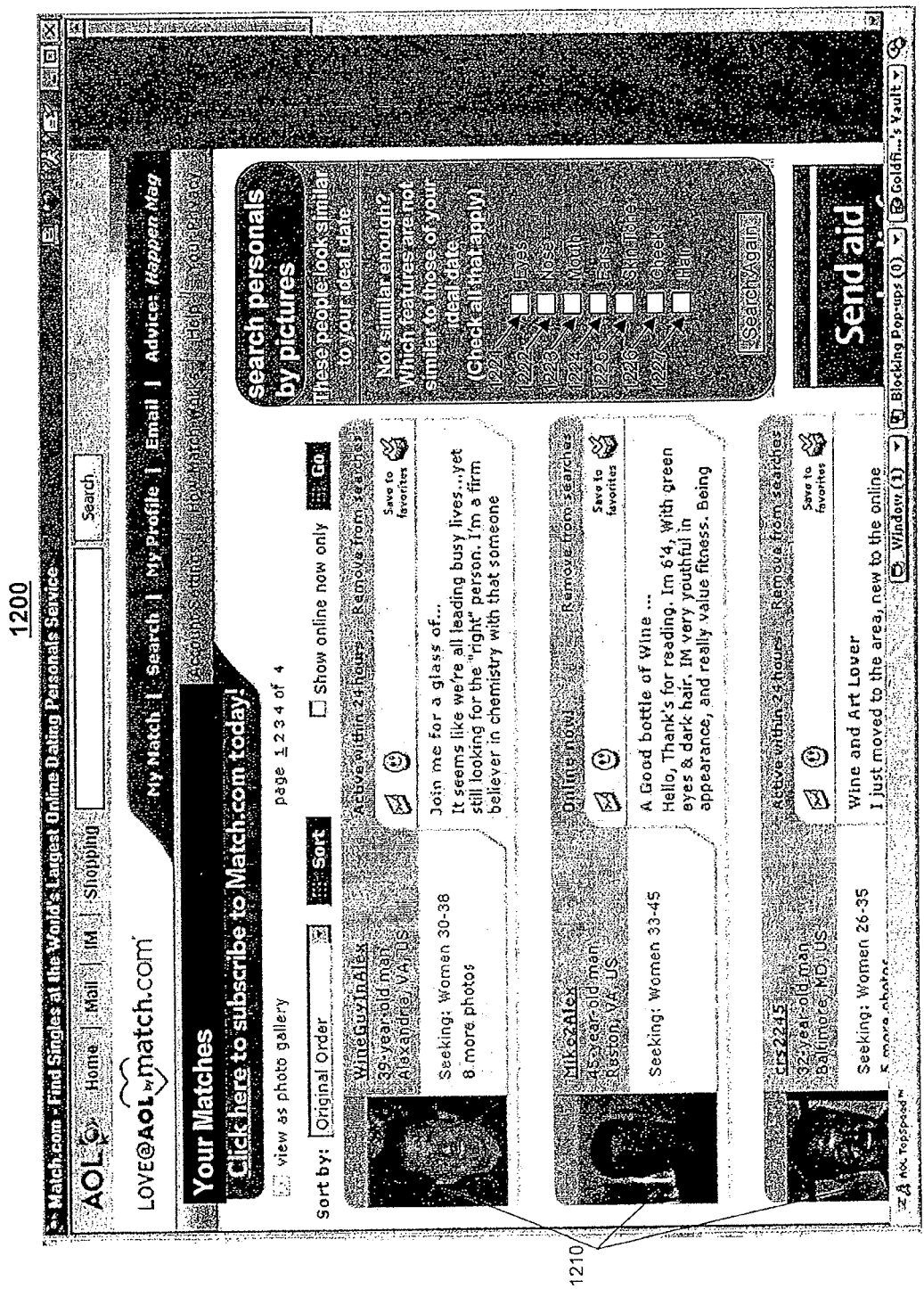

FIGS. 11 and 12 are examples of UIs 1100 and 1200 configured to provide alternative means for allowing a user to provide user feedback about the search result images.

UI 1100 includes search result images 1110 and 1120. UI 1100 also includes radio buttons 1112 and 1114 associated with search result image 1110 and radio buttons 1122 and 1124 associated with search result image 1120. A user may use UI 1100 to indicate explicitly whether the user finds the search result images to include a face that is similar to a query face provided by the user in a query photograph. For example, the user may indicate that search result image 1110 is similar to the query image by selecting radio button 1112, while further indicating that search result image 1120 is not similar to the query image by selecting radio button 1124.

UI 1200 includes search result images 1210. UI 1200 also includes checkboxes 1221-1227 configured to allow a user to indicate facial features of the faces in the search result images that are not similar to those of the query image. Alternatively, or additionally, UI 1200 also may provide a list of facial features in the search result images that the user may indicate are similar to the query image (not shown). For example, a user may select checkboxes 1221 and 1225 to indicate that the eyes and skin tone of the faces in the search result images are not similar enough to those features in the query image. The user then may select Search Again button 1260 to initiate another search to yield search result images having eyes and skin tone that are more similar to those of the face in the query image, which may be accomplished, for example, by weighting features or distances between features appropriately in process 208a or process 208b.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Computer-useable mediums suitable for storing computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A method for determining facial similarity among images in a social networking service, the method comprising:
   determining, using at least one processor, inequalities between a plurality of training faces associated with one or more images based on received indications of similarity between a plurality of image groupings;
   determining, using the at least one processor, a mapping function between an objective feature space and a psychological feature space that indicates human perception of facial similarity based on the inequalities;
   receiving a query associated with an image that includes a query face;
   determining, using the at least one processor, one or more search result images from among a plurality of images associated with users of a social networking service based on the mapping function; and
   providing the search result images to a user of the social networking service.

2. The method of claim 1 wherein:
   the query comprises receiving an image for analysis from the user; and
   the one or more search result images comprise images associated with at least one online photo album and the user.

3. The method of claim 2 wherein:
   the one or more search result images further comprise images associated with at least one online photo album and other users of the social networking service.

4. The method of claim 1, further comprising:
   receiving a selection made by the user of characteristics associated with a person in the image that includes a query face; and
   removing search result images from the determined one or more search result images based on the received selection.

5. The method of claim 1, further comprising:
   detecting one or more classes associated with the query face;
   identifying characteristics of the query face based on at least the determined one or more classes; and
   reducing a field of search associated with the received query based on at least on the identified characteristics.

6. The method of claim 1, further comprising:
   identifying a plurality of search image results from among the provided search image results that was accessed by the user;
   determining one or more common characteristic of the plurality of accessed search image results;
   updating the search results based at least on the determined one or more common characteristics; and
   providing the updated search results images to the user.

7. The method of claim 1, further comprising:
receiving an identifier associated with the query face; and
determining one or more search result images based on the received identifier.

8. A system for determining facial similarity among images within a social networking service, comprising:
a memory device storing a plurality of instructions; and
at least one processor that executes the plurality of instructions to cause the at least one processor to:
determine inequalities between a plurality of training faces associated with one or more images based on received indications of similarity between a plurality of image groupings;
determine a mapping function between an objective feature space and a psychological feature space that indicates human perception of facial similarity based on the inequalities;
receive a query associated with an image that includes a query face;
determine one or more search result images from among a plurality of images associated with users of a social networking service based on the mapping function; and
provide the search result images to a user of the social networking service.

9. The system of claim 8, wherein:
the query comprises receiving an image for analysis from the user; and
the one or more search result images comprise images associated with at least one online photo album and the user.

10. The system of claim 9, wherein:
the one or more search result images further comprise images associated at least one online photo album and other users of the social networking service.

11. The system of claim 8, wherein the at least one processor further executes the plurality of instructions to:
receive a selection made by the user of characteristics associated with a person in the image that includes a query face; and
remove search result images from the determined one or more search result images based on the received selection.

12. the system of claim 8, wherein the at least one processor further executes the plurality of instructions to:
detect one or more classes associated with the query face;
identify characteristics of the query face based on at least the determined one or more classes; and
reduce a field of search associated with the received query based on at least on the identified characteristics.

13. The system of claim 8, wherein the at least one processor further executes the plurality of instructions to:
identify a plurality of search image results from among the provided search image results that was accessed by the user;
determine one or more common characteristic of the plurality of accessed search image results;
update the search results based at least on the determined one or more common characteristics; and
provide the updated search results images to the user.

14. The system of claim 8, wherein the at least one processor further executes the plurality of instructions to:
receive an identifier associated with the query face; and
determine one or more search result images based on the received identifier.

15. A non-transitory computer-useable medium storing a computer program, the computer program including a set of instructions that are executable by at least one processor to cause the at least processor to:
determine inequalities between a plurality of training faces associated with one or more images based on received indications of similarity between a plurality of image groupings;
determine a mapping function between an objective feature space and a psychological feature space that indicates human perception of facial similarity based on the inequalities;
receive a query associated with an image that includes a query face;
determine one or more search result images from among a plurality of images associated with users of a social networking service based on the mapping function; and
provide the search result images to a user of the social networking service.

16. The medium of claim 15, wherein:
the query comprises receiving an image for analysis from the user; and
the one or more search result images comprise images associated with at least one online photo album and the user.

17. The medium of claim 16, wherein:
the one or more search result images further comprises images associated at least one online photo album and other users of the social networking service.

18. The medium of claim 15, wherein the set of instructions further cause the at least one processor to:
receive a selection made by the user of characteristics associated with a person in the image that includes a query face; and
remove search result images from the determined one or more search result images based on the received selection.

19. The medium of claim 15, wherein the set of instructions further cause the at least one processor to:
detect one or more classes associated with the query face;
identify characteristics of the query face based on at least the determined one or more classes; and
reduce a field of search associated with the received query based on at least on the identified characteristics.

20. The medium of claim 15, wherein the set of instructions further cause the at least one processor to:
identify a plurality of search image results from among the provided search image results that was accessed by the user;
determine one or more common characteristic of the plurality of accessed search image results;
update the search results based at least on the determined one or more common characteristics; and
provide the updated search results images to the user.

21. The medium of claim 15, wherein the set of instructions further cause the at least one processor to:
receive an identifier associated with the query face; and
determine one or more search result images based on the received identifier.

* * * * *

UNITED STATES PATENT AND TRADEMARK OFFICE
CERTIFICATE OF CORRECTION

PATENT NO. : 8,542,888 B2
APPLICATION NO. : 13/549959
DATED : September 24, 2013
INVENTOR(S) : Sharon M. Perlmutter et al.

It is certified that error appears in the above-identified patent and that said Letters Patent is hereby corrected as shown below:

In the Claims

Claim 5, Col. 18, Line 58, "at least on" should read as --at least one of--.

Claim 6, Col. 18, Line 61, "was" should read as --were--.

Claim 10, Col. 19, Line 34, "associated at least" should read as --associated with at least--.

Claim 12, Col. 19, Line 50, "at least on" should read as --at least one of--.

Claim 17, Col. 20, Line 30, "associated at least" should read as --associated with at least--.

Claim 19, Col. 20, Line 46, "at least on" should read as --at least one of--.

Signed and Sealed this
Seventeenth Day of December, 2013

Margaret A. Focarino
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,542,888 B2 | Page 1 of 1 |
| APPLICATION NO. | : 13/549959 | |
| DATED | : September 24, 2013 | |
| INVENTOR(S) | : Sharon M. Perlmutter et al. | |

It is certified that error appears in the above-identified patent and that said Letters Patent is hereby corrected as shown below:

In the Specification

At col. 1, line 5, insert the following new paragraph:

-- GOVERNMENT SUPPORT STATEMENT

This invention was made with government support under Grant No. EEC9402726 awarded by The National Science Foundation. The government has certain rights in the invention. --

Signed and Sealed this
Eighteenth Day of November, 2014

Michelle K. Lee
*Deputy Director of the United States Patent and Trademark Office*